United States Patent [19]

Nealon et al.

[11] Patent Number: 5,403,161
[45] Date of Patent: Apr. 4, 1995

[54] AIR FOIL BLADE AND METHODS OF MAKING SAME

[75] Inventors: Dennis T. Nealon, 2542 E. Elmwood, Mesa, Ariz. 85213; Robert J. Hudson, Jr., Green Valley, Ariz.

[73] Assignees: Dennis T. Nealon; Joan L. Nealon, both of Mesa, Ariz.

[21] Appl. No.: 180,099

[22] Filed: Jan. 12, 1994

Related U.S. Application Data

[63] Continuation of Ser. No. 985,628, Dec. 3, 1992, abandoned, which is a continuation-in-part of Ser. No. 677,435, Mar. 29, 1991, abandoned.

[51] Int. Cl.$^6$ .......................... F01D 5/14; B29C 45/14
[52] U.S. Cl. ..................................... 416/226; 416/230; 416/241 A; 29/889.71; 264/46.7
[58] Field of Search ................... 416/226, 229 R, 230, 416/241 A; 29/889.6, 889.7, 889.71; 264/46.7

[56] References Cited

U.S. PATENT DOCUMENTS

| | | | |
|---|---|---|---|
| 2,423,700 | 7/1947 | Hardy | 416/229 |
| 3,305,196 | 2/1967 | Hanlon | 416/241 A |
| 4,477,228 | 10/1984 | Duffy et al. | 416/241 A |
| 5,076,760 | 12/1991 | Westman et l. | 416/226 |

FOREIGN PATENT DOCUMENTS

| | | | |
|---|---|---|---|
| 901587 | 7/1945 | France | 416/229 R |
| 1355427 | 2/1964 | France | 416/230 |
| 215498 | 9/1986 | Japan | 416/241 A |
| 808685 | 2/1981 | U.S.S.R. | 416/229 R |

Primary Examiner—Edward K. Loook
Assistant Examiner—James A. Larson
Attorney, Agent, or Firm—Richard R. Mybeck

[57] ABSTRACT

For use in rear turbine stabilized helicopters, a air foil blade comprising an integrally formed and readily replicated spar and blade in which the blade is created from compounded plastic having cellular structure and adherent to the spar. The air foil blade is produced by a unique adaptation of an injection molding process using a foamed polypropylene thermoplastic material.

16 Claims, 3 Drawing Sheets

AIR FOIL BLADE AND METHODS OF MAKING SAME

This is a continuation of application Ser. No. 07/985,628, filed Dec. 3, 1992, now abandoned, which is a continuation-in-part of application Ser. No. 07/677,435, now abandoned.

The present invention relates generally to a helicopter air foil blade and more particularly to novel and unique air foil blade and methods for fabricating such a spar-blade assemblage which is especially useful in so-called rear turbine stabilized helicopters.

BACKGROUND OF THE INVENTION

Rear turbine stabilized helicopter, the so-called "Notartype", are a new generation of helicopters which are characterized by the use of an internal turbine-like mechanism in the tail section of the craft to steer and stabilize the craft. The turbine replaces the traditional rear external blade (so-called "tail rotor") which heretofore has caused numerous spin-outs and fatal crashes.

The rear turbine comprises a housing having a plurality of air foil blade assemblies arranged therein to form a turbine or fan-like device in the tail section of the air craft. In theory, the placement of a blade turbine in the tail assembly and the venting of the combustion gases from the prime motor through that turbine to counteract the torque of the main rotor proved sound. In practice, however, it was not reliable because the air foil blades had to be hand made and were constructed of a hand laminated fiberglass covering which was disposed upon a rubber core. This construction disintegrated on use and caused the pilot to lose the degree of aircraft control needed for safe flight. In addition, the discrepancies between hand crafted blades created an extraordinary high percentage of rejects.

As indicated above, the prior art air foil blades were produced by telescopically disposing a blade in the end of a metal spar and thereafter covering the assemblage by a hand lay-up process in which layers of woven material, such as laminated fiberglass, were laid over and around the structure. The laminate was thereafter impregnated with an epoxy adhesive, baked, and trimmed.

Another prior art attempt to make an improved air foil blade utilized a rubber mandrel covered with a plurality of layers of nylon mesh. The layers of nylon mesh were then epoxy coated, placed into a mold, and the entire mold was thereafter baked in an autoclave. The baked article was then split open on three sides to form a clothes pin-like member from which the rubber mandrel was removed. Next, epoxy was placed into the resulting shell and the epoxy filled member was then baked in an autoclave. The baking caused the epoxy to expand within the shell and form a foam core. The resulting blade was then balanced, sanded, shaped and painted.

Blades produced in this fashion were also found to be extremely unreliable because they would easily delaminate when chipped and would totally self destruct when such delamination was allowed to progress undetected. Delamination of any degree creates blade imbalance and erratic performance of the craft in which they were used. Further, air foil blades made in this fashion were so labor-intensive and the cost so high that only the government could afford to purchase them.

It is toward the solution of these prior art air foil blade problems by providing a novel and unique blade which enhances the reliability and safety of the aircraft in which it is used while substantially reducing of the unit cost of each blade that the present invention is directed.

BRIEF DESCRIPTION OF THE INVENTION

The present invention relates to a new and improved air foil blade and method of producing such an air foil blade which can be used in special applications such as in a rear turbine stabilized helicopter and will substantially eliminate the faults found in prior art devices.

More particularly the present invention is directed to a new air foil blade which does not delaminate, does not require secondary trimming operations, is more impact resistant, will withstand a higher wind shear, is lighter, and can be produced faster and more economically than any such air foil blade known heretofore.

Specifically, the present invention involves unique insight into the design and fabrication of a safe and reliable air foil blade. Unexpected benefits arise from the method of fabrication which includes the placement of a metal spar into an injection mold cavity and making a pattern thereof and thereafter injecting a specially compounded composite plastic into the cavity pattern to form an integral and complete part. After cooling, the part is removed from the mold and is ready for use without any further treatment. The time to produce an air foil blade using the present invention is from two to five minutes per blade whereas the similar part utilized heretofore and specified in certain military contracts, requires two hours or more to produce a single blade. For just one helicopter, the blade production time alone has been reduced from over twenty six hours to approximately sixty minutes using the present teaching and produces not only obvious economics but enhances the safety of the pilot and crew who must depend on the integrity of such blades for their safety.

Accordingly, a principal object of the present invention is to provide new and improved methods of producing a air foil blade for helicopters which replace the manual fabrication lay-up methods heretofore employed to provide a more lasting, a more uniform and a more reliable air foil blade than has heretofore been obtainable.

Another object of the present invention is to provide a new and improved air foil blade from which the delamination and self destruction problems inherent in the prior art devices has been eliminated.

Still another object of the present invention is to provide a new and safer air foil blade for use in applications such as the rear turbine stabilized helicopters and the like.

A still further object of the present invention is to provide a more cost efficient and uniformly reproducible method for producing air foil blades which enhance the safety and the integrity of the aircraft dependant thereupon.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF THE PREFERRED EMBODIMENTS

The present invention relates to air foil blades for use in rear turbine stabilized helicopter aircraft and more particularly to such blades and methods of fabricating such air foil blades from a compounded thermoplastic. The air foil blades of the present invention are especially useful, durable and safe when utilized in rear turbine stabilized helicopters.

Figure 5:
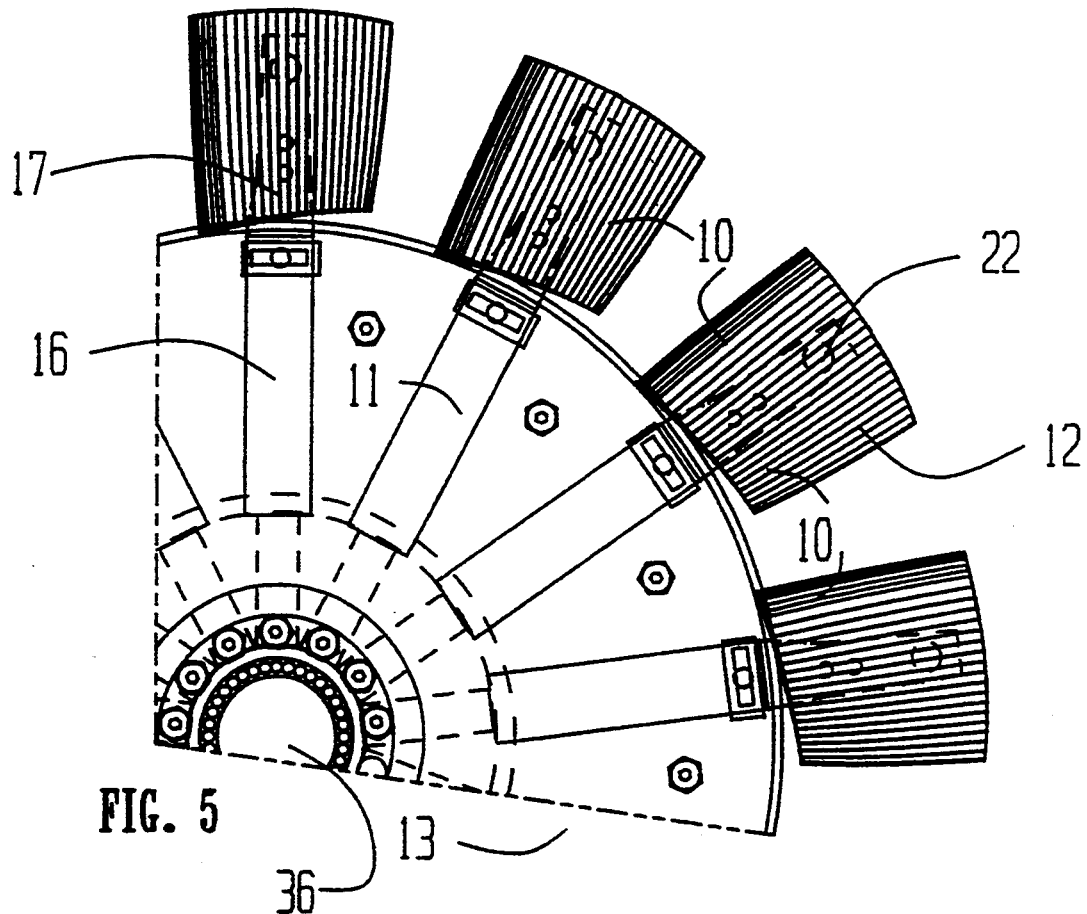
FIG. 5 is a frontal elevation, partially broken away, of a rear stabilizing helicopter turbine with air foil blades embodying the present invention.

Referring to FIGS. 1-4 of the drawing, in which the air foil blade embodying the present invention is indicated by the general reference 10, each air foil blade be broadly comprises a metal spar 11 and a thermoplastic blade 12. When employed in a rear stabilized helicopter turbine 13, such air foil blades 10 are used as shown in FIG. 5.

Figure 1:
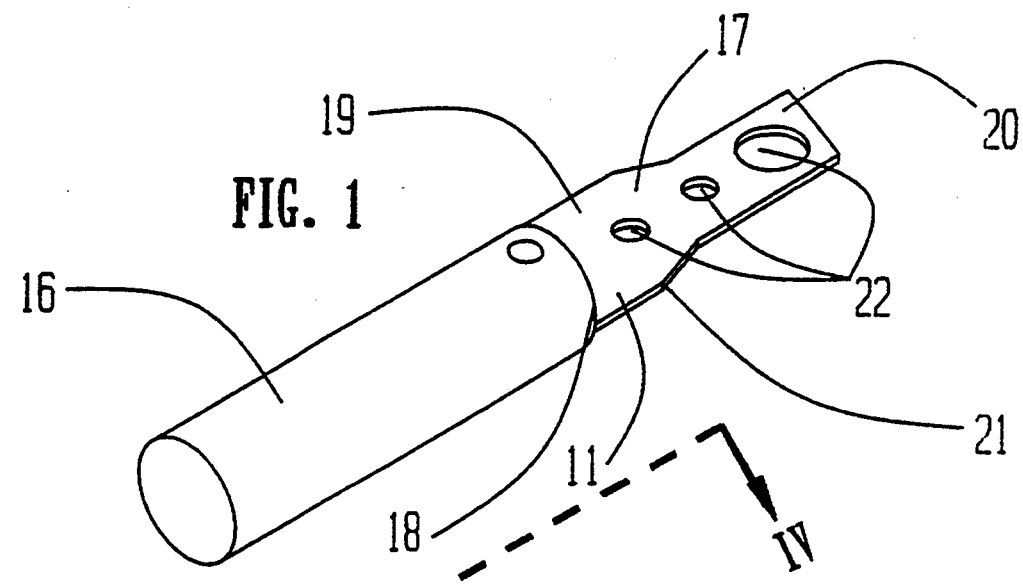
FIG. 1 is an isometric view of a spar mast employed in the present invention.
Figure 2:
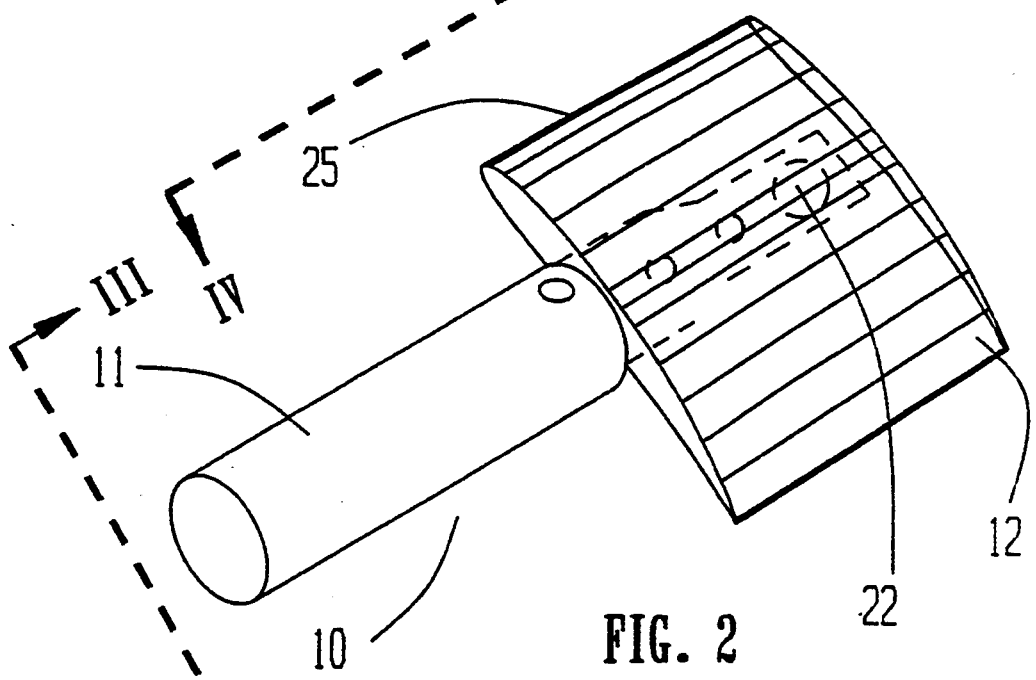
FIG. 2 is an isometric view of a air foil blade embodying the present invention.
Figure 3:
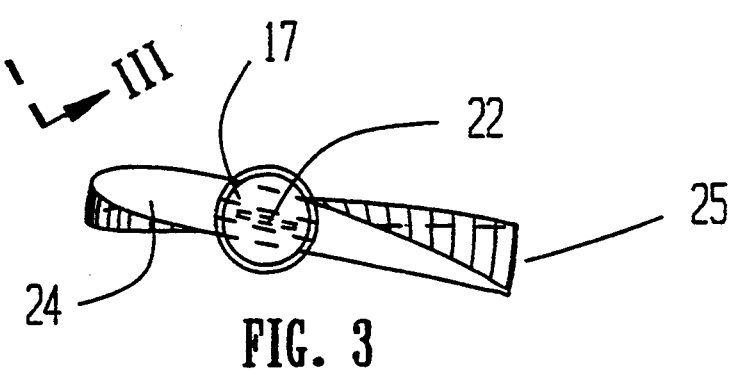
FIG. 3 is a cross section of the air foil blade of FIG. 2 taken on line III—III.
Figure 4:
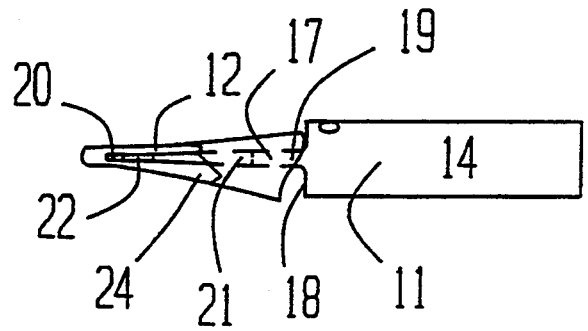
FIG. 4 is a cross section of the air foil blade of FIG. 2 taken on line IV—IV.

As shown in FIG. 1, metal spar 11 consists of a cylindrical body portion 16 and an axially extending flange portion 17 integrally formed therewith generally across a diameter of end surface 18 of body portion 16. Flange portion 17 has a proximal (relative to surface 18) segment 19 and a narrower distal segment 20 conjoined by an inwardly tapered transition segment 21. A plurality of openings 22 are disposed through flange portion 17 for a purpose to be hereinafter described in detail.

Blade member 12 comprises a tapered curved aerodynamically figured body portion 24 having a generally rectangular perimeter 25 and disposed about spar 11 and extending through openings 22 to integrally secure blade member 12 to spar 11 and form an integral air foil blade 10. Body portion 24 is configured to conform in shape to a computer generated air foil to throw air.

Figure 6:
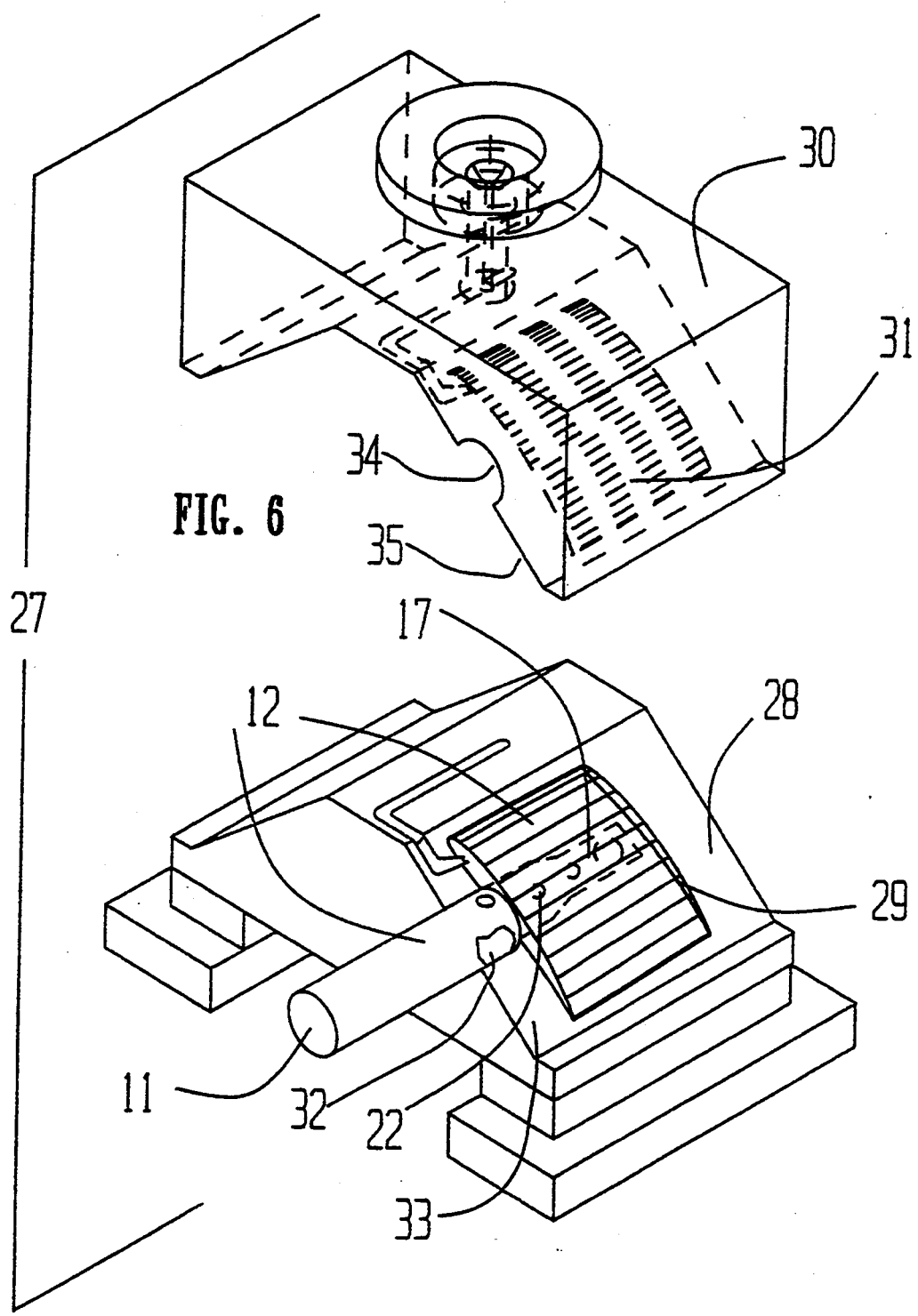
FIG. 6 is an expanded view of a cover and base of an aluminum mold used in the practice of the present invention

In one practice of the present invention air foil blade 10 is fabricated in a suitable mold assembly 27, shown in FIG. 6, which is used in conjunction with a conventional injection molding machine. Mold 27 consists of a base member 28 containing a portion of blade cavity 29 and an upper member 30 containing the complementary portion 31 of cavity 29. Base member 28 further contains a concave seating means 32 defined in the upper surface 33 thereof to support body portion 16 of spar 11 during the molding cycle. Upper member 30 is provided with a concave arch portion 34 disposed in the lower surface 35 thereof and operatively coactive with seating means 32 to provide encircling support for body portion 16 of spar 11 during the molding cycle.

Metal spar 11, is disposed upon seating means 32 so that flange portion 17 extends into the mold 27 which in turn is mounted into a conventional injection-molding machine (not shown).

Compounded plastic material, as is hereinafter described in detail, is then charged into the mold by the molding machine to fill the cavity 29 which conforms in size and shape to blade 12. Mold assembly 27 is preferably formed of a light weight metal such as aluminum. Once the mold is filled and cooled, the mold 27 is opened and a finished air foil blade 10 is removed.

In one practice of the present invention, the thermo plastic material is injected into the mold to integrally form blade portion 12 to flange portion 17 to form air foil blade 10. The thermo plastic of choice is a foamed glass-fiber reinforced polypropylene. This material is preferred because it provides excellent chemical resistance, a replicatable cellular structure which provides consistent weight with each injection, and has a decomposition temperature which closely matches the processing temperature of the foamed polymer thereby insuring consistent good quality for the molded part.

The glass-fiber reinforced polypropylene material when combined with 1-4% by weight of a foaming agent such as azodicarbonamide will provide an air foil blade having a specific gravity of not more than 1.13 and preferably less than 1.0.

Glass-fiber reinforced polypropylene materials which have been found suitable for the practice of the present invention include P1-20FG-2100 and P15-FG-0752 (both manufactured by Thermofil, Inc., Brighton, Mich.), and MPP-FG20 and MPP-FG30 (both manufactured by Modified Plastics, Santa Ana, Calif.). Foaming agents suitable for use in the practice of the present invention include powdered azodicarbonamide CELOGEN-AZ (available as from Uniroyal, Akron, O) and premixed concentrate containing azodicarbonamide suspended in a suitable carrier (available from THERMOFOAM 1 Thermofil, Inc., Brighton, Mich.).

In one practice of the present invention, thermoplastic compositions, when injection molded onto a metal spar weighing between 71 grams and 72 grams, must bring the total maximum weight of the finished air foil up to about 115 grams. Accordingly, the weight of the injected molded plastic blade must not exceed 43 grams to 44 grams.

A preferred composition for the molding of air foil blades in the practice of the present invention includes a glass fiber filled polypropylene thermoplastic having an optimum temperature for consistent cell structure of less than 450 deg. F admixed with about 1% to 4% by weight of a concentrated azodicarbonamide foaming agent such as THERMOFOAM 1 manufactured by Thermofil, Inc. to achieve from about 5% to about 20% density reduction of the finished polypropylene blade.

Air foil blades produced using the materials in accordance with and the procedures of the present invention uniform from blade to blade and possess no large voids. Each air foil blade is made under controlled conditions so as to eliminate delamination and self destruction in use and each blade obtains substantially identical physical properties, heretofore unattainable with handcrafted blades.

As shown, the present invention enables an integral air foil blade to be formed out of a thermoplastic material which obtains all of the desirable physical properties provided by the hand layup air foil heretofore used while substantially enhancing the reproductability and substantially reducing the unit cost.

The physical properties obtained by an airfoil blade produced in accordance herewith was 500,000 psi flexural modulus, 650 psi wind shear, low water absorption, excellent chemical resistance while meeting the weight restriction of approximately 44 grams.

When formed as described, a plurality of air foil blades 10, usually thirteen, are installed into a rear stabilized turbine 13 of a helicopter and extend radially from the central shaft 36 of the turbine 13 in the conventional manner as shown in FIG. 5. The air foil blades 10 are controlled, using known technology which need not be described here, to provide pilot control to the pitch of the blades and effect the flow of air and exhaust gases to create a wind shear sufficient to counteract the tendency of the main rotor and keep the cabin from moving rotationally in response thereto.

From the foregoing, it becomes apparent that new and useful means and methods have been herein described and illustrated which fulfill all of the aforestated objectives in a remarkable fashion. It is of course understood that such modifications, alterations and adaptations as may readily occur to one having the ordinary skills in the art to which this invention pertains are intended within the spirit of the present invention which is limited only by the scope of the claims appended hereto.

Accordingly, what is claimed is:

1. An airfoil blade for use in rear turbine stabilized helicopters comprising: a metal spar having a body portion that is adapted for operative installation in a rear stabilizing turbine of a rear turbine stabilized helicopter, and an axially extending flange portion integrally formed with said body portion, said flange portion having a proximal segment, a narrower distal segment and a tapered transition segment operatively interposed between said proximal segment and said distal segment and integrally formed therewith, said flange portion having a plurality of openings defined therethrough in spaced relationship to each other; and an aerodynamically contoured thermoplastic blade member surrounding said flange portion and extending through said openings to integrally secure said blade member to said metal spar, said thermoplastic being such that said blade member will not self-destruct when installed in the rear stabilizing turbine of a rear turbine stabilizing helicopter.

2. An airfoil blade according to claim 1 in which said thermoplastic blade member is formed by injection molding a composition containing glass-fiber reinforced polypropylene and a foaming agent in relative amounts such that said composition, upon curing, forms a replicatable rigid cellular structure having a consistent weight and provides stability when used in the rear stabilizing turbine of a rear turbine stabilized helicopter.

3. An airfoil blade according to claim 2 in which said composition contains from about one to about four percent by weight of azodicarbonamide as the foaming agent.

4. An airfoil blade according to claim 3 in which said thermoplastic blade member has a 500,000 psi flexural modulus, 650 psi wind shear, low water absorption and excellent chemical resistance.

5. An airfoil blade according to claim 1 wherein said blade is abrasion resistant.

6. An airfoil blade according to claim 5 wherein said blade is capable of withstanding stresses on the order of magnitude of $5 \times 10^5$ psi flexural modulus and $6.5 \times 10^2$ psi wind shear.

7. An airfoil blade according to claim 6 which has a mass of no more than 44 grams.

8. An airfoil blade according to claim 2 wherein said blade is capable of withstanding stresses on the order of magnitude of $5 \times 10^5$ psi flexural modulus and $6.5 \times 10^2$ psi wind shear.

9. An airfoil blade according to claim 1 which has a mass of no more than 44 grams.

10. An airfoil blade according to claim 2 which has a mass of no more than 44 grams.

11. An airfoil blade according to claim 4 which has a mass of no more than 44 grams.

12. An airfoil blade for use in rear turbine stabilized helicopters comprising: a metal spar having a body portion and an axially extending flange portion integrally formed with said body portion, said flange portion having a proximal segment, a narrower distal segment and a tapered transition segment operatively interposed between said proximal segment and said distal segment and integrally formed therewith, said flange portion having a plurality of openings defined therethrough in spaced relationship to each other; an aerodynamically contoured thermoplastic blade member surrounding said flange portion and extending through said openings to secure said blade member to said metal spar; said metal spar including means for operatively securing said blade to the rear stabilizing turbine of a rear turbine stabilized helicopter.

13. An airfoil blade according to claim 12 in which said thermoplastic blade is formed by injection molding a composition containing thermoplastic polypropylene and a foaming agent in an amount such that the blade, upon curing, has a replicatable rigid cellular core and an abrasion resistant skin thereabout.

14. An airfoil blade according to claim 13 in which said composition contains from about one to about four percent of azodicarbonamide as said foaming agent.

15. A method of producing an airfoil blade for use in stabilizing the flight of rear turbine stabilized helicopters comprising: forming a mold having a mold cavity having a shape conforming to the shape of an aerodynamically contoured blade portion of an airfoil blade and complementary seating means formed on the mold for receiving and holding a preformed spar member thereupon, said spar member having a body portion seatable in said seating means and an axially extending flange portion extending into said mold cavity, said flange portion having a plurality of openings defined therethrough in spaced relationship to each other; preparing a mixture of thermoplastic polypropylene and a compatible foaming agent; and injecting said mixture into said cavity to surround said flange portion and fill said cavity and said openings; curing said molded foamed thermoplastic in said cavity to form an airfoil blade having a blade portion extending about and through said flange portion and inseparable therefrom; and removing said airfoil blade from said mold.

16. A process according to claim 15 wherein said blade is capable of withstanding stresses on the order of magnitude of $5 \times 10^5$ psi flexural modulus and $6 \times 10^2$ psi wind shear.

* * * * *